Dec. 23, 1969  A. DE HALLER ET AL  3,485,550
ARRANGEMENT FOR REINFORCEMENT OF THE INTENSITY
OF OPTICALLY PRODUCED IMAGES

Filed Oct. 11, 1965  4 Sheets-Sheet 1

INVENTORS
ANDRÉ DE HALLER
WILLY BAUMGARTNER

Dec. 23, 1969 A. DE HALLER ET AL 3,485,550
ARRANGEMENT FOR REINFORCEMENT OF THE INTENSITY
OF OPTICALLY PRODUCED IMAGES
Filed Oct. 11, 1965 4 Sheets-Sheet 2

INVENTORS
ANDRÉ DE HALLER
WILLY BAUMGARTNER

INVENTORS
ANDRÉ DE HALLER
WILLY BAUMGARTNER

United States Patent Office 3,485,550
Patented Dec. 23, 1969

3,485,550
ARRANGEMENT FOR REINFORCEMENT OF THE INTENSITY OF OPTICALLY PRODUCED IMAGES
André De Haller and Willy Baumgartner, Zurich, Switzerland, assignors to Gesellschaft zur Forderung der Forschung an der Eidgenossischen Technischen Hochschule, Zurich, Switzerland
Filed Oct. 11, 1965, Ser. No. 494,540
Claims priority, application Switzerland, June 24, 1965, 8,972/65
Int. Cl. G02f 1/34
U.S. Cl. 350—161                                4 Claims

ABSTRACT OF THE DISCLOSURE

The invention involves an improvement in apparatus for increasing the intensity of an optically-produced image as disclosed in U.S. Patents 2,896,507, Mast et al. The improvement consists essentially in using a reflective liquid body to provide a reflecting layer, said liquid body being bounded on one side by a deformable layer and on the other side by an elastically deformable layer. The intensity of the electrostatic field varies periodically with respect to time.

---

The present invention relates to a device for increasing the intensity of optically-produced images.

Arrangements of this kind are already known and are described for instance in U.S. patent specifications Nos. 2,896,507, 2,892,380 and 3,137,762. These include at least one grating-like zone illuminated by a light source, which zone is optically copied on to an associated grating-like screen by reflection on one side of a flexible, reflector surface. The reflector surface is carried by an elastically-deformable layer and is deformable therewith. The image to be intensified is produced in raster form on a photo-electric control layer, which influences an electrostatic field located between it and the reflector surface. Furthermore, means are provided for the optical observation of the reflector surface at the edges of the grating-like screen or between the grating, if more than one are present. The reflector surface is preferably formed on a projection screen, upon which an image of greater brightness than and corresponding to the image to be intensified is formed. The invention relates to improvements in the arrangements described. In order that the under-lying problem of the invention and the technical progress achieved thereby may be better understood, reference is first made to the construction and method of operation of a previously known arrangement of the kind previously mentioned, in relation to FIGS. 1 to 5 of the accompanying drawings, and then to two embodiments according to the present invention in relation to FIGS. 6 and 7 of the accompanying drawings.

In the drawings, in which all figures are drawn schematically and not to scale:

Figure 1:
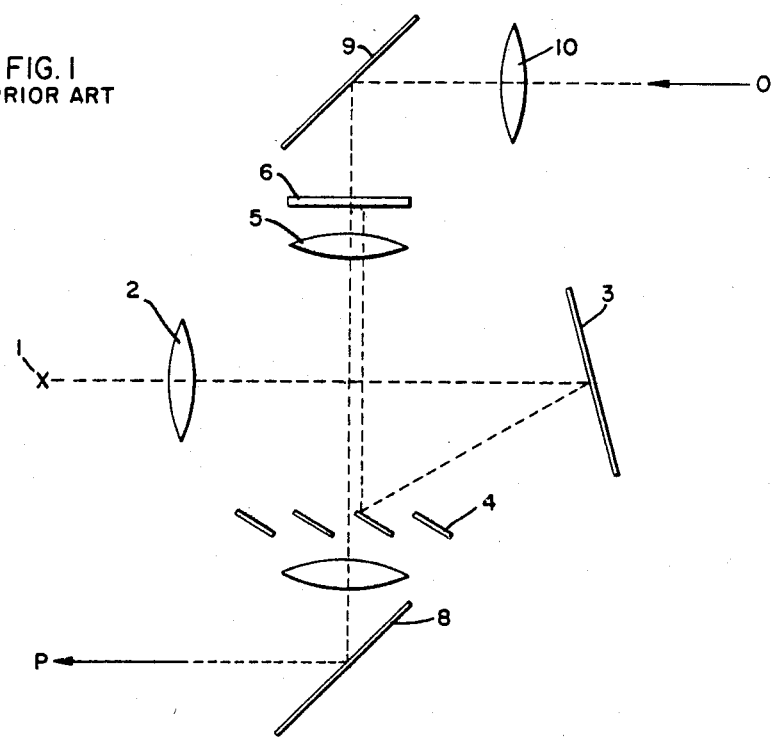
FIG. 1 shows schematically the general arrangement of a known device.

According to FIG. 1, an intense light source 1, for example an electric arc, is arranged so that its light beam is concentrated by a condenser 2 and is reflected from a reversing mirror 3 into an arrangement of parallel bars 4. The arrangement consists of several mutually-parallel spaced opaque bars 4 in the form of striations which are required to serve two purposes. The first purpose of the bars 4 consists in forming striation-like zones which are strongly illuminated by the light from the light source 1. To this end, the sides of the bars 4 shown facing upwards in FIGURE 1 are made reflective. The second purpose of the bars 4 is the formation of a striated screen. On the illuminated side of the bars 4 are located an objective 5 and a light control cell 6 composed of several layers, the structure of which is further described below with reference to FIG. 2. The cell 6 has a reflecting surface on which the illuminated bars 4, with the help of the objective 5, produce an image of the striated screen formed by the bars 4 themselves, with the result that the rays of light pass through the objective 5 twice. A projection objective 7 and a reversing mirror 8 are so arranged that light from the reflecting surface of the light control cell 6 passing through the gaps between the bars 4 travels in the direction of the arrow P on to a projection screen (not shown). The bars 4 act in this projection only as a striated screen which is not imaged on the projection screen. Another reversing mirror 9 and an objective 10 cause an image which can be derived from a transparency, from an oscillograph screen or from actual objects to be optically produced on a photo-electric control layer of the light control cell 6 by means of the light rays passing in the direction of the arrow O.

Figure 2:
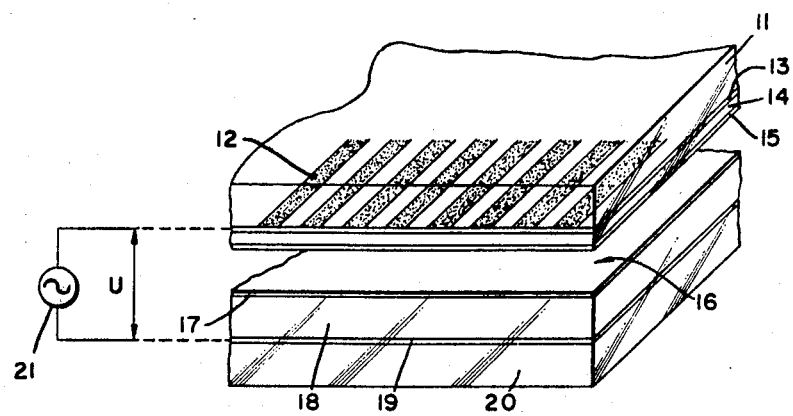
FIG. 2 illustrates on a larger scale and in perspective view a cross-section of a detail of the device according to FIG. 1.

The construction of the light control cell 6 is shown in FIG. 2. A transparent carrier plate 11 is provided with an opaque line grating 12, for example consisting of metal strips deposited by vacuum evaporation. On the underside of the carrier plate 11 is arranged a light-transmitting electrically conductive electrode sheet 13 which may comprise a thin metal film or a film of tin dioxide which has been produced for example by spraying or by evaporation of the substance concerned. It should be understood that the positions of the line grating 12 and the electrode sheet 13 may be transposed. Below the grating 12 and the electrode sheet 13 is disposed the previously mentioned photo-electric control layer 14, for example consisting of selenium. Below this is an opaque, electrically insulating layer 15.

Similarly, on the upper side of a second transparent carrier plate 20 there is provided a light-transmitting, electrically conductive electrode coating 19. Covering this coating is a layer 18 which is elastically deformable under the effect of an electrostatic field, and which is formed, for example, from polyvinylchloride and a plasticiser having a thickness of about 100 microns and an elastic modulus of between $10^3$ and $10^6$ dynes/cm.$^2$. A flexible reflecting layer 17, consisting for example of evaporated silver, aluminum, or the like, adheres to the layer 18 and is deformable therewith. Between the opaque layer 15 and the reflecting layer 17 is formed an interspace 16 filled with a gaseous medium, for example with air, which makes possible the deformation of the layers 17 and 18. The surfaces of all the plates and layers 11 to 20 are flat and parallel to one another. An alternating voltage source 21 of potential U is connected to both the electrode sheets 13 and 19.

Figure 3:
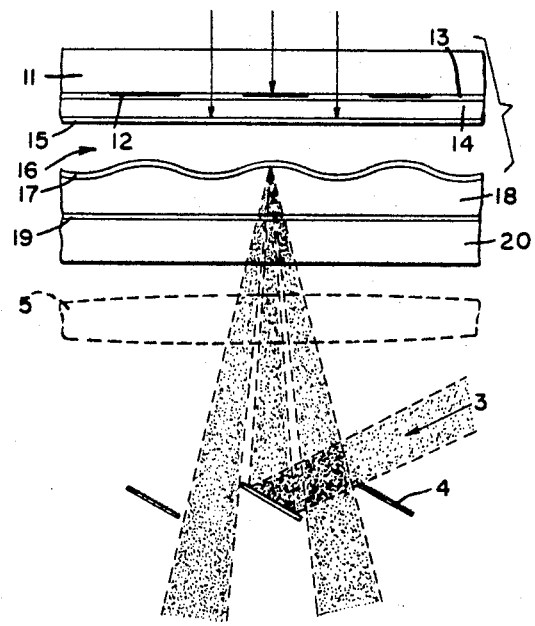
FIG. 3 shows details of FIG. 1 on a larger scale and serves to illustrate the method of operation of the device of FIG. 1.

The method of operation of the arrangement described is as follows. An electric field is generated by the electrodes 13 and 19 having a potential U therebetween, and this field permeates the layers 14 to 18. This electric field has different values in the various layers corresponding to their electrical resistance. Because of the small resistance of the deformable layer 18, practically the whole potential U exists between the electrode 13 and the reflecting layer 17 alone, which may be assumed for the sake of simplicity. The electric field strength perpendicular to the reflecting layer 17 exerts a force on the latter in accordance with the laws of electrostatics which is able, by a suitable choice of the constant of elasticity of the deformable layer 18 and of the thickness of the reflecting layer 17 and deformable layer 18, to deform both these layers, this effect being able to take place without difficulty on account of the gaseous intermediate layer 16. If no light passes through the objective 10 and the reversing mirror 9 on to the photo-electric control lever 14, then the electric field is homogeneous apart from edge effects, and it follows that there is no deformation of the layers 17 and 18. The reflecting layer 17 consequently remains flat. Since the image of the illuminated upper side of the bars 4 again falls exactly on the bars, no light passes between the bars 4 to the objective 7 and the projection screen remains dark If, however, light corresponding to the arrow O passes through the line grating 12 on to the photo-electric control layer 14, the electrical resistance of the layer 14 at each of these places where the light is incident changes. This produces a change in the effective field strength acting on the layer 14 at these places, and, because the field is no longer homogeneous, leads to an almost sinusoidal deformation of the layers 17 and 18 at these places, as illustrated in FIG. 3. The thus curved reflecting surface 17 represents a reflecting diffraction grating and allows light from the light source 1 to pass through the gaps between the bars 4, since now, beacuse of the diffraction, the images of the illuminated bars fall not only exactly on the bars themselves but also are able to pass partially or completely through the gaps between the bars 4. The light passing through the gaps between the bars 4 is reflected by means of the objective 7 and the mirror 8 in the direction of the arrow P on to the projection screen where bright image areas corresponding to the illuminated portions of the photo-electric control layer 14 appear.

The opaque layer 15 prevents the rest of the strong light rays from the objective 5 which penetrate the reflecting layer 17 from reaching the photo-electric control layer 14 and having an adverse influence thereon. If the light-transmitting power of the reflecting surface 17 is made sufficiently small, the opaque layer 15 may be omitted in some cases.

It is here important to note that the lines of the grating 12 extend parallel to the bars 4, since only then does the desired deformation of the layers 17 and 18 take place so that the diffracted light from the source 1 can pass through the gaps between the bars 4. If the lines of the grating 12 extend for example at right-angles to the bars 4, then the light is only diffracted in the longitudinal direction of the bars 4. The images of the illuminated upper surfaces of the bars 4 would in this case, after diffraction, again come to be incident on the bars 4, and no light could pass between the bars 4 on to the projection screen.

A more detailed analysis shows that in the known form of light intensifying system described above several essential, although mainly technological conditions must be fulfilled. These conditions concern the geometry and the physical properites of the photo-electric control layer 14 and the reflecting layer 17. The problems in connection with the photo-electric control layer are described in more detail in U.S. patent specification No. 3,137,762 and are not discussed here as they are of no great significance in connection with the present invention.

The reflecting layer 17 must be easily deformable under the influence of the electrostatic field applied thereto. Therefore, the thickness of the layer, metallised for example with silver or aluminum, must be extremely small and must be of the order of 0.05 micron. Consequently, part of the light originating from the source 1 penetrates the layer 17 and must be absorbed by the electrically insulating, opaque layer 15. The latter must have an extremely high specific resistance, in order that the photo-electric control layer 14 is not short-circuited above a tolerable limit. This limit is dependent of the properties of the material of the control layer 14. Materials having the desired properties as well as sufficient opacity are not numerous. Their light-transmitting ability is never zero and depends on the wavelength of the light. The permissible strength of the light source 1 is limited on this basis by the tolerable intensity of the light emanating from the source 1 and penetrating the layer 15. Moreover, the movement of the reflecting layer 17 must be in complete conformity with that of the elastically deformable layer 18 at every point on their common surface. It is sufficient in this respect to point out that the coefficients of thermal expansion of the layers 17 and 18 are different on account of their nature. There is therefore a danger that in the event of a change of temperature the reflecting layer 17 will become wrinkled or cracked and impair the operation of the system. Actually, any change of shape or structure of the reflecting surface of the layer 17 whose origin does not lie in the image to be intensified results in a corresponding appearance of disturbances on the projection screen, in consequence of which the quality of the intensified images may be seriously reduced. Furthermore, it should be realised that on operation of the system the amplitude of the deformation of the reflecting layer 17 which is a few microns in thickness will cause the formation of wrinkles or cracks in the layer. It is also not impossible for the layers 17 and 18 to slide over one another, either over a limited area of contact or over their entire extent. The reflecting layer 17 could therefore appear to be wrinkled.

Figure 4:
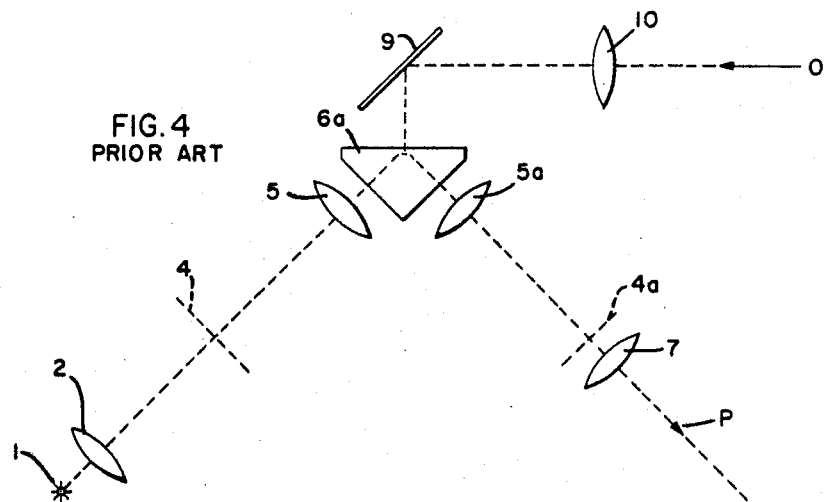
FIG. 4 shows schematically a known variant of the device.
Figure 5:
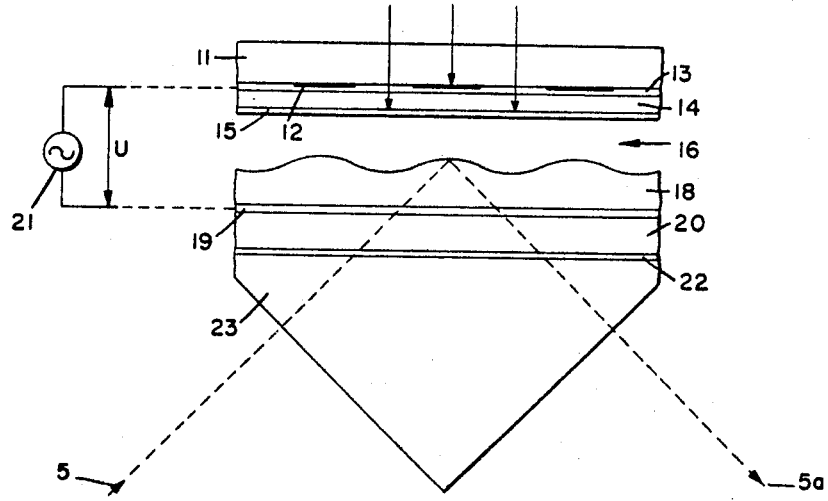
FIG. 5 shows, on a larger scale, details of the device shown in FIG. 4.

One means of illuminatnig the reflecting layer 17 consists in not allowing the rays of light originating from the source 1 to strike the layer 18 perpendicularly but at an inclined angle thereto such that total internal reflection takes place at the free surface of the layer. For this purpose, several changes to the described arrangement must be made. One such variant of the known arrangement is illustrated schematically in FIG. 4, while FIG. 5 shows the light control cell of the arrangement on a larger scale. The light transmitted from the source 1 is concentrated by the condenser 2 and is directed on to the bars 4. The objective 5 produces an image at infinity of the illuminated gaps which are formed by the interstices between the bars 4 and which represent strip-like zones illuminated by the source 1. After total internal reflection in a light control cell 6a, the light rays pass through an objective 5a which produces a second image of the illuminated gaps in the plane of a complementary arrangement of bars 4a. The bars 4a serve as a grating-like screen and are so arranged that the image of each of the gaps of the arrangement of bars 4 falls exactly on one of the bars 4a. The method of operation of the deformation of the layer 18 is similar to that of the arrangement described above, but in this case the electrostatic field acts directly on the surface of the deformable layer 18 (see FIG. 5). If the objective 10 and the mirror 9 do not direct any light on to the photo-electric control cell 14, no light reaches the objective 7 which produces an optical image of the upper surface of the deformable layer 18 on the projection screen, so that the projection screen P remains blank. On the other hand, if light travelling in the direction of the arrow O passes through the line grating 12 on to the photo-electric control layer 14, then, as previously described, the parts of the surface of the layer 18 corresponding to the illuminated parts of the photo-electric control layer 14 are approximately sinusoidally deformed, thus forming a diffraction grating which permits some of the light rays to pass between the bars 4a and be incident on the objectives 7. These light rays produce bright areas on the projection screen, which areas correspond to the illuminated areas of the photo-electric control layer 14.

On practical grounds, the carrier of the deformable control layer 18 is not made directly as a prism. It is preferable rather to provide a prism 23 on the carrier plate 20. Optical contact between these two members 20, 23 which must form a unit optically is guaranteed by filling the interspace 22 between the two members 20 and 23 with a liquid having the same refractive index as the glass.

The described variant of the known arrangement likewise suffers from the following two disadvantages.

(1) Since the deformable layer 18 is not arranged at right angles to the optical axis of the projection objective 7, a linearly distorted image of the image projected on the projection screen is produced, which distorted image is elongated in one direction. This distortion may be compensated by the use of a suitable optical correcting device.

(2) Practical experience shows that a considerable part of the light emitted by the light source 1 penetrates the deformable layer 18 without undergoing total internal reflection at the free surface thereof.

It is evident from the above considerations that although the use of the total internal reflection at the free surface of the layer 18 of light from the light source 1 allows many difficult technical problems to be solved which arise from the construction of the rigid reflecting layer 17 (FIG. 3), it does not prevent a comparatively large part of the light from reaching the electrically insulating, opaque layer 15 whose technical limitations of effectiveness have already been mentioned above. Moreover, the known method results in distortion of the intensified image which makes necessary the use of the special optical correcting devices.

The present invention aims to eliminate all the described disadvantages of the known devices described above and is therefore concerned with a device for intensifying an optically-produced image which comprises at least one strip-like zone which is arranged to be illuminated by light from a light source and is arranged to be imaged on an associated grating-like screen by reflection at one side of a flexible optically reflecting layer which abuts an elastically deformable layer and is deformable therewith, a photo-electric control layer arranged on the other side of the reflecting layer and on which the image to be intensified is arranged to be pictured in line form, said control layer being arranged to influence an electrostatic field formed between it and the reflecting layer, and means for optically observing the reflecting layer at the edges of the grating-like screen.

The novelty of the device according to the invention essentially consists in that the reflecting layer is formed by a reflective liquid substance which is bounded on one side by the previously mentioned deformable layer and on the other side by a second elastically deformable layer, and in that the intensity of the electrostatic field varies periodically with respect to time.

Figure 6:
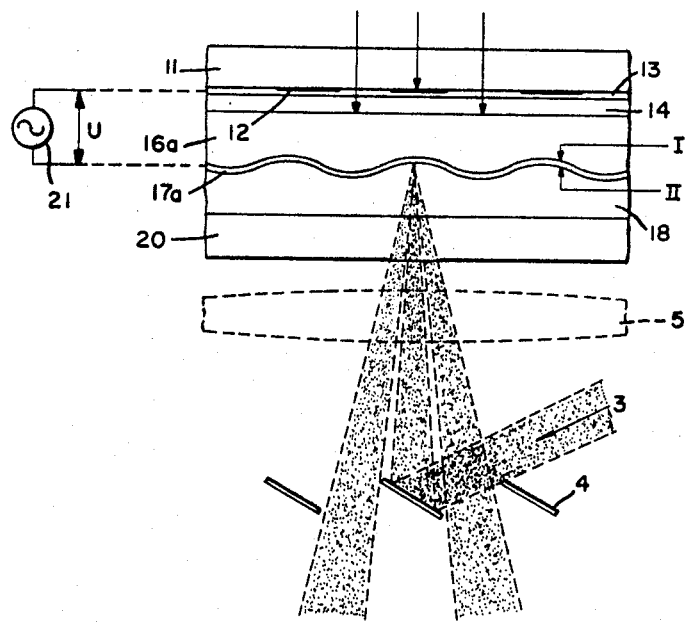
FIG. 6 is a representation analogous to FIG. 3 of details of one embodiment of the device according to the invention.
Figure 7:
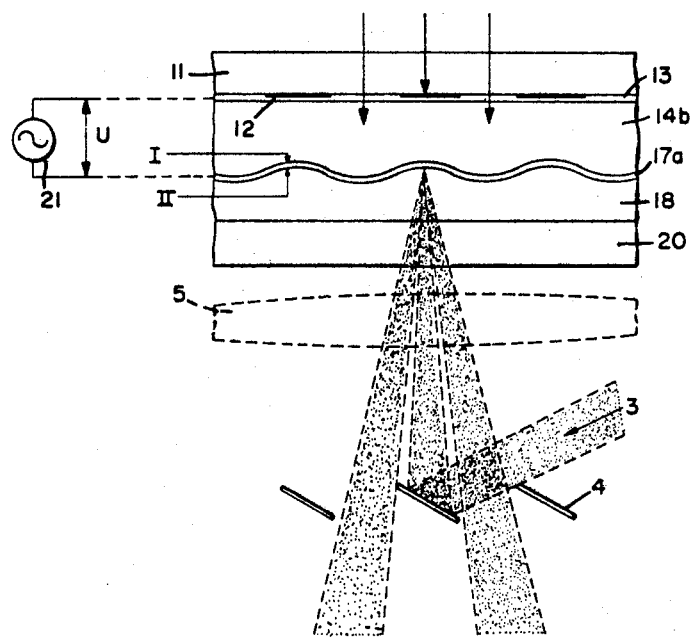
FIG. 7 illustrates another embodiment of the invention, which is a modification of that shown in FIG. 6.

Further characteristics and details of the invention and the advantages obtained therefrom will now be described with reference to FIGS. 6 and 7 of the accompanying drawings. In FIGS. 6 and 7 details of the light control cells of the two embodiments according to the invention are represented purely schematically.

The light control cell shown in FIG. 6 comprises a first transparent carrier plate 11 which is provided with a light-impervious line grating 12 consisting, for example, of metal strips deposited by vacuum evaporation. On the underside of the carrier plate 11 is mounted a light-permeable, electrically conductive electrode sheet 13 which may consist of a thin metal film or a film of tin oxide produced, for example, by sublimation or by evaporation of the substance concerned. The positions of the line grating 12 and the electrode plate 13 may be transposed in certain circumstances. Below the line grating 12 or the electrode plate 13 is located a photo-electric control layer 14 which consists, for example, of selenium. On the underside of the control layer 14 is formed an electrically insulating, elastically deformable layer 16a which may consist of a silicon polymeride and a plasticiser, for example, silicon rubber and a plasticiser, and which should preferably have an elastic modulus between $10^3$ and $10^6$ dynes/cm.$^2$. The thickness of the layer 16a is about 100 microns.

On the upper side of a second light-transmitting carrier plate 20 is located likewise light-transmitting, elastically deformable layer 18 which may be made exactly the same as the layer 16a and may consist of the same material. The two elastically deformable layers 16a and 18 are spaced from each other by a distance of the order of 10 to 60 microns and consequently define an interspace therebetween. For operation of the device, this interspace is filled with a liquid substance having good light reflecting properties, thus forming a liquid reflecting layer 17a. Preferably, the reflecting layer 17a consists of a metal or a metallic alloy. If the device is intended to operate at normal room temperatures, the reflecting layer 17a may consist of mercury or an amalgam containing a small quantity, approximately 1% by weight of indium. In the quiescent state of the described light control cell the surfaces of the carrier plates 11 and 20 and the various layers 13, 14, 16a, 17a and 18 are flat and parallel to each other. An alternating voltage source 21 is connected across the electrode plate 13 and the electrically conductive reflecting layer 17a in order to establish a time-varying electrostatic field transversely to the photo-electric control layer 14 and the elastically deformable, electrically insulating layer 16a.

The described light control cell as shown in FIG. 6 is distinguished from the known device shown in FIG. 3 by the following differences:

(1) The omission of the electrically insulating, opaque layer 15.

(2) The replacement of the gaseous layer 16 by the electrically insulating, elastically deformable layer 16a.

(3) The replacement of the rigid reflecting layer 17 by the reflecting layer 17a which is liquid at the operating temperature of the device.

(4) The omission of the electrode sheet 19 whose function is now performed by the electrically conductive reflecting layer 17a.

The light control cell as shown in FIG. 6 is arranged in exactly the same way as the light control cell 6 of FIG. 1 in the earlier device for increasing the intensity of optically-produced images. Of the earlier device only the bars 4 and the lens 5 are shown in FIG. 6. However, as shown in FIG. 1, the device includes a strong light source 1, an associated condenser 2, a reversing mirror 3, a projection objective 7, a reversing mirror 8, and a projection screen P, as well as an objective 10 and another reversing mirror 9 for optically producing an image whose intensity is to be increased on the photo-electric control layer 14 of the light control cell.

The method of operation of the device with the light control cell shown in FIG. 6 is as follows.

To simplify understanding it will first be assumed that the potential U of the electric voltage source 21 is a direct voltage. An electrostatic field is set up between the electrode sheet 13 and the reflecting layer 17a by means of the potential U, this field extending through the photo-electric control layer 14 and the elastically deformable layer 16a in which the field potential assumes different values according to the electrical resistance of these layers. The component of the electrostatic field in the direction perpendicular to the boundary surface I between the deformable layer 16a and the reflecting layer 17a exerts a force on the surface I. If no light passes through the objective 10 and the reversing mirror 9 on to the photo-electric control layer 14, the electrostatic field is constant over the whole surface I, disregarding edge effects. Consequently, the perpendicular components of the force on the surface I are all equally large, with the result that the surface I experiences no deformation and remains flat. The boundary surface II between the reflecting layer 17a and the lower deformable layer 18 also remains flat. Thus, the bars 4 which are illuminated by means of the light source 1 are imaged exactly on themselves by reflection of the light rays at the reflecting surface II and with the help of the objective 5, whereby no light can reach the bars 4 and consequently the projection objective 7 and the projection screen P. The projection screen P therefore remains dark.

If, on the other hand, light passing in the direction of the arrow O (FIG. 1) passes through the line grating 12 and falls on the photo-electric control layer 14, the electrical resistance of the illuminated areas of the control layer will be changed. This causes a change in the electrostatic field strength over these areas which affects the boundary surface I of the reflecting layer 17a. The surface I is therefore exposed to an inhomogeneous distribution of field strength, and an approximately sinusoidal deformation of those parts of the surface I which lie opposite the illuminated areas of the photo-electric control layer 14 takes place. The fact that the deformation of the surface I is sinusoidal is due to the line grating 12. The period of the sinusoidal deformation coincides with the period of the line grating 12. This deformation of the surface I is made possible by the elastic deformability of the layer 16a and the liquid reflecting layer 17a.

Pressure waves and displacement waves from the surface I are established transversely through the liquid reflecting layer 17a during the time period needed for the establishment of the desired deformation, i.e. until equilibrium is set up between the field strength acting on the surface I and the elastic reaction force of the layer 16a (gravitational forces have a negligible effect). Calculations and experiments show that these pressure waves and displacement waves are superimposed on each other such that they cause on arrival at the boundary surface II a pressure distribution on the surface which is analogous point for point to the electrostatic field distribution on the surface I. The conformity of this distribution is emphasized by the fact that one or both of the deformable layers 16a and 18 have a comparatively large internal friction by means of which sufficient damping is guaranteed for overcoming any mechanical resonance occurring in the deformable layers 16a, 17a and 18. For example, the layers 16a and 18 may consist of a silicon polymeride base with an added plastisiser. Consequently, the boundary surface II is also approximately sinusoidally deformed, and it thus forms a diffraction grating for the light rays emitted by the light source 1 and reflected at the surface II. As a result, light falls on those areas of the projection screen P corresponding to the illuminated areas of the photo-electric control layer 14. However, the projection screen is only illuminated during the time which is necessary for boundary surface I to reach its deformation equilibrium, after which time the pressure distribution over the deformed surface I remains constant. The surface II then resumes its original flat equilibrium position.

From the above, it is evident that the inhomogeneous pressure distribution produced on the surface I by the electrostatic field which is generated by means of the source 21, at present assumed to be a direct voltage source, and which is modulated by means of the variable resistance of the photo-electric control layer 14 caused by illumination of the control layer with light corresponding to the arrow O (FIG. 1), is reproduced on the surface II point for point as long as the surface I is deformed and has not reached its new deformed equilibrium state in which the elastic layer 16a compensates for the electrostatic field point for point. In order that the increased intensity image appears on the projection screen P for as long as the image to be intensified remains stationary on the photo-electric control layer 14, it is important, and this is a basic condition for the functioning of the device, that during this time period the surface I never assumes an equilibrium state but is maintained in permanent motion. In other words, it is necessary that the electrostatic field produced by the voltage source 21 should vary periodically with respect to time, this being established for example by using an alternating voltage source.

By the use of an alternating voltage source 21 an alternating electrostatic field is generated which is modulated by the variable resistance of the photo-electric control layer 14 as a result of its illumination by light travelling in the direction of the arrow O (FIG. 1). This modulated alternating electrostatic field causes a pulsating field at the surface I. The point for point distribution of this pulsating field is transmitted transversely across the reflecting layer 17a on to the surface II which reflects light from the source 1 and which forms a diffraction grating which, as has been pointed out with respect to the known device, causes the appearance of bright areas on the projection screen P corresponding to the illuminated areas of the photo-electric control layer 14. Since the reflecting surface II is in pulsating motion like the surface I, the brightness of the illuminated areas on the projection screen P varies periodically between zero and a maximum value in rhythm with the motion of the surface II. If this rhythm is rapid enough, for example in excess of 20 cycles per second, the human eye cannot perceive fluctuations in the intensity of the intensified images on the projection screen because of persistence of vision.

It must be pointed out that the existence of the electrically insulating, elastically deformable layer 16a is indispensable for the functioning of the light control cell shown in FIG. 6. If the space occupied by the layer 16a were to be filled with a liquid or gaseous medium, the liquid reflecting layer 17a would have no fixed shape. This could cause free movement while carrying out manipulations of the device or under the influence of some shock or external vibration, could cause its thickness to alter locally, or could cause it to split into incoherent parts. All these cause uncontrollable and random changes in the intensifying efficiency of the light control cell, as well as the formation of disturbing light spots on the projection screen which are contradictory to the requirements laid down in practice with regard to the trouble-free and reliable utility of the device. If the space occupied by the layer 16a were to be filled with a rigid material, these problems would be accepted without any deformation due to its reaction to the electrostatic field, whereby the transmission of forces transversely through the liquid reflecting layer for deforming the reflecting surface II would become impossible. Lastly, if the space occupied by the layer 16a were to be completely omitted and the liquid reflecting layer 17a were to be placed in direct contact with the photo-electric control layer 14, then the latter would be electrically short-circuited by the metallic material of the reflecting layer 17a.

It is an advantage that the deformable layer 16a is opaque to the light which provides the image to be intensified on the photo-electric control 14, in order to prevent any second, disturbing illumination of the photo-electric control layer 14 by reflection of this light at the surface I of the reflecting layer 17a.

The amplitude of the deformation of the reflecting surface II for a given electrostatic field at the surface I is strictly dependent on the thickness of the liquid reflecting layer 17a, on the geometrical and mechanical properties of the elastically deformable layers 16a and 18, and on the frequency of the alternating voltage U of the electrical voltage source 21. Calculations and experiments have shown that the thickness of the reflecting layer 17a is not critical and may vary between 10 and 60 microns, although it is preferably about 30 microns.

The optical transparency of a metallic layer of the above thickness is practically zero, which is the reason why a very high density of illumination is permissible on the surface II from which the light rays from the source I (FIG. 1) are reflected.

In an actual embodiment, in which the elastically deformable layers 16a and 18 had an elastic modulus of $3.10^3$ dynes/cm.$^2$ and a thickness of 110 and 150 microns respectively, an optimum frequency for the alternating voltage U of between 1500 and 2400 c./s. was found, with the result that the thickness of the liquid reflecting layers 17a varied between 10 and 40 microns. Within this range it is possible to adjust the frequency such that an alteration in the thickness of the liquid reflecting layer 17a by several microns, for example due to different thermal expansion of adjacent parts, only causes a negligible and permissible change in the amplitude of the deformation of the reflecting surface II, and in consequence, the desired efficiency of the intensification provided by the light control cell is achieved.

It may be advantageous to replace the photo-electric control layer 14 and the adjacent elastically deformable layer 16a in the light control cell shown in FIG. 6 by a single layer 14b, as in the second embodiment shown in FIG. 7. In this case, the layer 14b has combined the photo-electric control properties of the layer 14 and the mechanical properties of the layer 16a.

The above-described improvements in the light control cell according to the present invention are also applicable to the device disclosed in U.S. patent specification No. 3,137,762. In the arrangement shown in FIG. 5 of this specification only one of the two voltages $U_1$ and $U_2$ should be made an alternating votlage to make the electrostatic field acting on the surface 1 of the liquid reflecting layer vary with respect to time.

The present invention and the described exemplary embodiment according to FIGS. 6 and 7 provides a definite technical advance over the previously known devices as shown in FIGS. 1 to 5:

(a) The liquid reflecting layer 17a ensures an almost complete optical separation between the photo-electric control layer 14 (FIG. 6) or 16b (FIG. 7) and the light rays from the light source 1 which serve to form the intensified images. This eliminates any inconvenience which could arise from illumination of the photo-electric control layer with light other than that producing the image to be intensified.

(b) The efficiency of the intensifying capabilities of the light control cell can be increased as compared with the devices described in U.S. specifications Nos. 2,896,507, 2,892,380 and 3,137,762 because of the comparative flexibility of the liquid reflecting layer 17a.

(c) Since the special opaque layer 15 and the electrode sheets 19 (FIGS. 2 and 3) of the known light control cells are fragile, manufacture of light control cells according to the present invention is simplified.

What we claim is:
1. Apparatus for intensifying the brightness of an optically projected image which comprises
   a strong light source,
   means forming the light from said source into a beam with a high degree of brightness as compared with that of said projected image,
   a screen,
   a system for projecting said beam to said screen,
   a multiple layer control means interposed in said system between said light source and screen for modulating said beam, said multiple layer control means including
   a first electrode layer permeable to light,
   a photo-conducting layer at one side of said first electrode layer,
   a second electrode layer spaced from said first electrode layer with said photo-conducting layer therebetween,
   a source of alternating votlage or application to said electrode layers to produce an electric field therebetween, which field has periodically varying intensity,
   said photo-conducting layer being disposed within said electric field,
   means for imaging in line form said image to be intensified onto said photo-conducting layer through said first electrode layer,
   a first elastically deformable layer arranged between said photo-conducting layer and said second electrode layer,
   a second elastically deformable layer permeable to light arranged at the opposite side of said second electrode layer, said second electrode layer being a light-reflecting substance which is liquid under working conditions of the apparatus,
   first and second surfaces of said second electrode layer contacting said first and second elastically deformable layers, respectively,
   said elastically deformable layers allowing said second electrode layer to be deformed,
   said beam from the strong light source being directed onto said second surface of the second electrode layer and reflected therefrom towards said screen,
   said system for projecting said beam to said screen including bar means intersecting said beam and providing at least one illuminated strip-like zone,
   means for imaging said illuminated zone on an associated light-stopping strip after reflection at said second surface of the second electrode layer,
   said electric field with periodically varying intensity constantly providing pressure waves within the liquid substance of said second electrode layer, said pressure waves enabling and assuring that any local deformation produced on said first surface of said second electrode layer by means of local variations of said electric field caused by said photo-conducting layer in response of variations in brightness of said image imaged on the photo-conducting layer is exactly reproduced on the opposite second surface of said second electrode layer, whereby said beam is modulated in a point-to-point manner in accordance with said image to be intensified.

2. A device according to claim 1, in which the reflecting substance is metallic.

3. A device according to claim 1, in which the elastically deformable layer adjacent to the photo-electric control layer is opaque to the light which produces the image to be intensified.

4. A device according to claim 1, in which the photo-electric control layer and the elastically deformable layer adjacent thereto are provided by a single elastically deformable layer formed of a composition having photoelectric properties.

References Cited

UNITED STATES PATENTS 2,896,507  7/1959  Mast et al. _____ 350—161

OTHER REFERENCES

A.P.C. Application of Paehr, Ser. No. 354,771, published May 18, 1943.

JEWELL H. PEDERSEN, Primary Examiner

WILLIAM L. SIKES, Assistant Examiner